US011890495B2

(12) United States Patent
Krutskevych

(10) Patent No.: US 11,890,495 B2
(45) Date of Patent: Feb. 6, 2024

(54) SPRINKLER BULB

(71) Applicant: Marioff Corporation Oy, Vantaa (FI)

(72) Inventor: Nazar Krutskevych, Gdańsk (PL)

(73) Assignee: MARIOFF CORPORATION OY, Vantaa (FI)

(*) Notice: Subject to any disclaimer, the term of this patent is extended or adjusted under 35 U.S.C. 154(b) by 137 days.

(21) Appl. No.: 17/541,469

(22) Filed: Dec. 3, 2021

(65) Prior Publication Data

US 2022/0176179 A1 Jun. 9, 2022

(30) Foreign Application Priority Data

Dec. 4, 2020 (EP) ..................................... 20212025

(51) Int. Cl.
*A62C 37/14* (2006.01)

(52) U.S. Cl.
CPC .................................... *A62C 37/14* (2013.01)

(58) Field of Classification Search
CPC ......... A62C 37/10; A62C 37/11; A62C 37/14; A62C 37/36; H01H 37/36
See application file for complete search history.

(56) References Cited

U.S. PATENT DOCUMENTS 4,281,718 A 8/1981 Claussen
5,967,238 A * 10/1999 Pepi ....................... A62C 37/14 169/56
6,491,110 B2 12/2002 Gil
8,402,985 B2 * 3/2013 Schmalfuss ............ A62C 37/14 137/72
8,714,180 B2 * 5/2014 Klug ...................... A62C 37/14 137/75
2004/0194976 A1 * 10/2004 Kretzschmar .......... A62C 37/14 169/42
2019/0344110 A1 * 11/2019 Tanklevskij ........... A62C 37/50
2020/0197734 A1 * 6/2020 Kim ....................... A62C 37/36
2023/0030385 A1 * 2/2023 Schade .................. A62C 37/14

FOREIGN PATENT DOCUMENTS

CN 114259681 A * 4/2022
JP H06230 A 1/1994
KR 20080015969 A 2/2008
KR 20180133105 A 12/2018
RU 2615954 C1 4/2017

OTHER PUBLICATIONS

European Search Report for application EP 20212025.9, dated Apr. 29, 2021, 8 pages.

* cited by examiner

*Primary Examiner* — Darren W Gorman
(74) *Attorney, Agent, or Firm* — CANTOR COLBURN LLP

(57) ABSTRACT

A sprinkler bulb 100 for a fire suppression system and a method of activating the sprinkler bulb 100. The sprinkler bulb includes a sealed frangible housing 110; a circuit device 120 within the housing 110, wherein the circuit device 120 comprises an ultraviolet light source 125; and a photosensitive fluid 130 within the housing that in use undergoes a chemical reaction when exposed to ultraviolet light from the light source 125.

13 Claims, 2 Drawing Sheets

SPRINKLER BULB

FOREIGN PRIORITY

This application claims priority to European Patent Application No. 20212025.9, filed Dec. 4, 2020, and all the benefits accruing therefrom under 35 U.S.C. § 119, the contents of which in its entirety are herein incorporated by reference.

TECHNICAL FIELD

The disclosure relates to a sprinkler bulb for a fire suppression system, particularly to a sprinkler bulb containing a photosensitive fluid, and to a method of activating a fire suppression system using a sprinkler bulb.

BACKGROUND OF THE INVENTION

Fire suppression systems typically include sprinkler devices arranged to expel or disperse fluid for suppressing or preventing fire. Sprinkler devices typically include sprinkler bulbs which are arranged to break at predetermined temperatures indicative of a fire (or of a risk of a fire), and thereby cause the sprinkler to emit fire suppression fluid. Sprinkler bulbs therefore operate as a type of mechanical fuse, which release fire suppression fluid from an associated source when they break. In order to function correctly, the bulb of the sprinkler device must reliably break under prearranged circumstances which occur in the event of a fire. The bulb is therefore a critical component of a sprinkler device.

Although sprinkler bulbs are arranged to break in the event that they are exposed to predetermined temperatures indicative of a fire, modern fire suppressions systems are also often capable of activating (i.e. breaking) sprinkler bulbs on command. This allows sprinkler bulbs to be pre-emptively activated e.g. in an area where a fire has been detected by other means (e.g. by user observation). By activating sprinkler bulbs on command, a fire can be prevented from spreading, or can be suppressed sooner and/or prevented from reaching temperatures that would otherwise cause the sprinkler bulb to break.

Fire suppression systems may therefore include a heating element in the form of a wire filament embedded in the sprinkler bulb. The systems can therefore heat sprinkler bulbs on command and cause them to break. Thus, the systems can discharge fire suppression fluid on command by activating (i.e. breaking) sprinkler bulbs. However, such activation can require significant power e.g. if a large number of bulbs are heated simultaneously. Given their safety-critical importance, improvements in activating sprinkler bulbs are desirable.

SUMMARY

According to a first aspect of the invention there is provided a sprinkler bulb for a fire suppression system, comprising: a sealed frangible housing; a circuit device within the housing, wherein the circuit device comprises an ultraviolet light source; and a photosensitive fluid within the housing that in use undergoes a chemical reaction when exposed to ultraviolet light from the light source.

The sprinkler bulb may therefore be configured so that activation of the ultraviolet light source causes the photosensitive fluid to undergo the chemical reaction. The chemical reaction may increase pressure within the housing and may therefore help or cause the housing to break (e.g. for activation of a sprinkler device associated with the sprinkler bulb). The housing and the photosensitive fluid may be configured so that the chemical reaction causes the sealed frangible housing to break. Thus, during use, activation of the ultraviolet light source inside the housing may cause the sealed frangible housing to break e.g. for releasing fire suppression fluid from a sprinkler device.

The sprinkler bulb may be suitable for use in a conventional sprinkler device and/or fire suppression system or the like. The sprinkler may be operable as a conventional sprinkler bulb, as well as operable by exposure to ultraviolet light. The sprinkler bulb may be arranged so that the housing cracks, bursts, shatters or otherwise breaks under predetermined conditions, for example predetermined conditions indicative of a fire event (e.g. a predetermined temperature), so that the sprinkler bulb may be used for activating a sprinkler device and/or a fire suppression system when the predetermined conditions are met. The sprinkler bulb may therefore be operable as a sprinkler bulb even without activation of the ultraviolet light source and the ensuing chemical reaction of the photosensitive fluid. The sprinkler bulb may therefore be failsafe e.g. in the event of failure of the circuit device and/or ultraviolet light source.

The sprinkler bulb may be suitable for preventing release of a fire suppressant or the like from a sprinkler device unless it breaks. For example, the sprinkler bulb may be configured to break, shatter or burst, when its temperature reaches a predetermined threshold. The sprinkler bulb may be arranged so that when it is intact it may support a predetermined mechanical load, e.g. for holding a seal or plug of a sprinkler device in place to prevent release of fire suppressant.

The photosensitive fluid may be any light-activated substance. The photosensitive fluid may be any suitable liquid and/or gas, but in one embodiment it is liquid (at least initially e.g. prior to undergoing the chemical reaction). The photosensitive fluid may be sealed within the housing. The housing may be hermetically sealed so that no fluid can enter or exit the housing unless the housing is broken. The housing may be configured to break when the pressure inside reaches a predetermined threshold. Since fluid pressure and temperature are related, the housing may also be configured to break when the photosensitive fluid reaches a predetermined temperature. The housing and the photosensitive fluid may be arranged so that the housing will break under predetermined conditions and the sprinkler bulb will cease to be able to support a mechanical load e.g. for preventing release of fire suppressant from a sprinkler device. The housing may be formed of any suitable material, and may comprise or be formed of glass, plastic, crystal, ceramic, quartzoid, or the like. The housing may be formed entirely of glass, plastic, crystal, ceramic, quartzoid, or the like.

The ultraviolet light source may be configured to emit radiation within a predetermined bandwidth of the ultraviolet spectrum. The ultraviolet light source may emit radiation having a wavelength between about 10 nanometres and about 400 nanometres. The wavelength may be between about 250 nanometres and about 350 nanometres. The wavelength may be between about 290 nanometres and 330 nanometres. The wavelength may be between about 300 nanometres and 320 nanometres. The wavelength may be between about 300 nanometres and 310 nanometres.

The photosensitive fluid may be selected and/or configured such that it has significant absorption at wavelengths of light that are emitted by the ultraviolet light source. The ultraviolet light source may be selected and/or configured such that it emits wavelengths of light for which the photosensitive fluid exhibits significant absorption. Thus, the ultraviolet light source may be selected based on the photosensitive fluid and/or the photosensitive fluid may be selected based on the ultraviolet light source.

The chemical reaction may be any suitable reaction of any suitable type, and may be any reaction that increases pressure within the housing, or causes the housing to break and/or burst. The chemical reaction may be a chemical decay and/or decomposition e.g. upon absorption of ultraviolet radiation from the light source. The chemical reaction may be photodissociation, photolysis, or photodecomposition. That is, the chemical reaction may be the decomposition or separation of molecules by the action of light.

The circuit device may be disposed within the photosensitive fluid in the housing, and may be freely disposed within the fluid. The circuit device may not be attached or otherwise mechanically coupled to the housing. The circuit device may not be tangibly connected to e.g. wires that lead outside the housing. The sprinkler bulb may not comprise any electrical components other than the circuit device. The circuit device may comprise a plurality of electronic components. The circuit device may comprise a printed circuit board or the like. The circuit device may not interfere with or otherwise affect the function of the sprinkler bulb in breaking under predetermined conditions. The circuit device may have no effect on the mechanical properties of the housing. The circuit device may be entirely within the housing, and may be entirely with an opening or chamber within the housing. The circuit device may be moveable within the housing since it may not be attached or otherwise coupled to the housing.

The circuit device may comprise a wireless module for receiving power. The circuit device may therefore wirelessly receive power from a source outside the sprinkler bulb. The circuit device may only receive power wirelessly from a device outside the sprinkler bulb. The sprinkler bulb may therefore be completely sealed and does not require connections, wiring, leads or the like passing into the housing, or embedded in the housing. The wireless module may be configured to receive signals, and the circuit device may be controllable via signals received by the wireless module.

The circuit device may be a passive circuit device and may be passive in the sense that it is not able to operate in isolation. It may comprise only passive electronic components. The passive circuit device may itself be incapable of controlling current flow therein. The passive circuit device may be configured only to operate in response to external signals and controls e.g. from a sprinkler device or other device external to the sprinkler bulb such as a sprinkler device controller or a fire suppression system controller.

The wireless module may comprise an inductor and a capacitor. The wireless module may be provided by only the capacitor and the inductor. The inductor and capacitor may be arranged as a resonant circuit, an LC circuit, a tank circuit, a tuned circuit, or the like. The circuit device may therefore be arranged to be powered via the wireless module, without a tangible, solid connection to anything outside the sprinkler bulb.

The circuit device may comprise a power storage device (e.g. a battery, cell or the like) for storing power received via the wireless module. The circuit device may therefore be charged via the wireless module. The circuit device may be powered wirelessly e.g. from a fire suppression system or a sprinkler device of a fire suppression system.

The circuit device may comprise a heating element operable to heat the photosensitive fluid. The circuit device may comprise a heating element for heating the photosensitive fluid within the housing of the sprinkler bulb. The heating element may be operable to heat the photosensitive fluid within the housing of the sprinkler bulb to thereby increase pressure within the housing. The heating element may be operable to heat the photosensitive fluid and thereby increase pressure in the housing of the sprinkler bulb and cause the housing to break.

The circuit device may be arranged so that the ultraviolet light source and/or the heating element is activated only upon fulfilment of predetermined conditions e.g. only if a signal received by the wireless module has an amplitude greater than a predetermined threshold. The sprinkler bulb may therefore be arranged so that the ultraviolet light source and/or the heating element can be activated only when needed by receiving a signal at the wireless module e.g. having a large enough amplitude. The circuit device may be configured so that the ultraviolet light source and/or heating element is/are not activated if the signal received by the wireless module is not a predetermined signal e.g. has an amplitude less than the predetermined threshold.

The circuit device many comprise a control unit configured to control the circuit device and the components thereof, e.g. to active the ultraviolet light source under predetermined conditions. The circuit device may be operable to activate either the ultraviolet light source or the heating element as needed The sprinkler bulb may also be more reliable than conventional sprinkler bulbs, since it can activate even if the heating element fails.

The photosensitive fluid may be 1,1,1,2,2,4,5,5,5-nonafluoro-4-(trifluoromethyl)-3-pentanone. The photosensitive fluid may be a fluorinated ketone. The photosensitive fluid may be CF3CF2C(=O)CF(CF3)2. The photosensitive fluid may be C2F5C(O)CF(CF3)2. The photosensitive fluid may be 3M™ Novec™ 1230 Fire Protection Fluid. The photosensitive fluid may be any suitable polymer. The photosensitive fluid may be any suitable organic or non-organic substance. The photosensitive fluid may be any substance that undergoes a chemical reaction in response to absorption of ultraviolet light. That is, the photosensitive fluid may be any light-activated substance.

The photosensitive fluid may itself be a fire suppressant. The photosensitive fluid may be electrically non-conductive and therefore may be suitable for immersion of electronics (and particularly the circuit device) therein. Thus, immersion of the circuit device in the photosensitive fluid may not cause the circuit device to malfunction (e.g. by short circuit) even when the electrical connections of the circuit device are directly in contact with, and submersed in, the photosensitive fluid.

The housing may be opaque to ultraviolet radiation, and may therefore substantially prevent transmission of ultraviolet radiation therethrough. The sprinkler bulb may therefore be used in environments containing ultraviolet radiation since the ultraviolet radiation will not be able to penetrate the housing and consequently will not cause the photosensitive fluid to react, degrade or decay.

The sprinkler bulb may be arranged to break by using less than 1 Watts of power. The sprinkler bulb may be arranged to break by using less than 0.5 Watts of power, and may be arranged to break by using less than 0.1 Watts of power. That is, the ultraviolet light source may use less than 1 Watts, 0.9 Watts, 0.8 Watts, 0.7 Watts, 0.6 Watts, 0.5 Watts, 0.4 Watts, 0.3 Watts, 0.2 Watts or 0.1 Watts of power to cause sufficient chemical reaction of the photosensitive fluid to cause the housing to break. The sprinkler bulb may therefore use significantly less power for activation than conventional systems, since a relatively high power is not needed to heat a wire filament or the like.

The sprinkler bulb may be operable to break by illumination of the ultraviolet light source without being specifically heated e.g. by a heating element or a nearby fire event. That is, the sprinkler bulb may be activated without being heated by a dedicated heating element or the like. The sprinkler bulb may therefore be activated at lower temperatures than conventional sprinkler bulbs. At the same time, the sprinkler bulb may still be activated if and when it is heated to sufficient temperatures. The sprinkler bulb may be operable to break at a temperature of less than 260 Celsius, less than 240 Celsius, less than 220 Celsius, less than 200 Celsius, less than 180 Celsius, less than 160 Celsius, less than 140 Celsius, less than 120 Celsius, less than 100 Celsius, less than 80 Celsius, less than 60 Celsius, and/or less than 40 Celsius. Typical sprinkler bulbs are often configured to activate at industry standard temperature ratings, and may be colour coded to indicate their temperature ratings. For example, the following table shows industry standard temperature ratings and corresponding sprinkler bulb colours.

| Temperature Rating | | Colour of Fluid |
|---|---|---|
| Celsius | Fahrenheit | Within Bulb |
| 57 | 135 | Orange |
| 68 | 155 | Red |
| 79 | 174 | Yellow |
| 93 | 200 | Green |
| 141 | 286 | Blue |
| 182 | 360 | Mauve |
| 227/260 | 440/500 | Black |

The sprinkler bulb may be configured according to the industry standards shown above, and may therefore have an industry standard temperature rating i.e. a predetermined temperature at which the housing breaks. The sprinkler bulb may also be coloured in accordance with the industry standards shown above. The sprinkler bulb may also be configured to break at temperatures lower than its temperature rating, by use of the ultraviolet light source for activation instead of by heating. In particular, the sprinkler bulb may be activated at a temperature less than 57 Celsius by use of the ultraviolet light source. The sprinkler bulb may therefore be activated at temperatures lower than those needed to activate conventional sprinkler bulbs. The sprinkler bulb may therefore be used in environments that are temperature sensitive, or in which high temperatures pose a risk e.g. computer server rooms, environments with flammable or explosive chemicals, and so on.

The sealed frangible housing, the ultraviolet light source, and/or the photosensitive fluid may be configured such that the housing will break when pressure within the housing reaches a predetermined threshold. Thus, the size, thickness, characteristics and/or mechanical properties of the housing may be chosen based on the ultraviolet light source and/or based on the photosensitive fluid and its chemical properties. Similarly, the ultraviolet light source and/or the photosensitive fluid may be selected based on the properties of the housing, so as to ensure the housing will break under predetermined conditions.

The sprinkler bulb may have a diameter of less than about 12 millimetres, less than about 8 millimetres, or less than about 4 millimetres. The sprinkler bulb may have a conventional size and may be any size suitable for a fire suppression system. However, the sprinkler bulb may be relatively small. The sprinkler bulb may have a size according to e.g. the Day-Impex Range of Standard Glass Bulbs, and may be a 826, 817, 933, 937, 984, 941, 942, or 989 bulb type.

According to a second aspect of the invention there is provided a fire suppression system comprising a sprinkler device and a sprinkler bulb as described herein with reference to the first aspect of the invention.

The sprinkler bulb may be arranged to prevent fire suppression fluid from being dispersed from the sprinkler device, and the sprinkler device may be arranged so that upon mechanical failure of the sprinkler bulb fire suppression fluid is released for suppression of a fire. In this regard the sprinkler bulb and sprinkler device may be arranged in a conventional manner and may be e.g. installed in a building, aircraft, vehicle, vessel, or other suitable structure where fire suppression capability may be needed. The fire suppression system may be installed in a building, aircraft, vehicle, vessel, or the like.

The sprinkler bulb may be arranged in the sprinkler device so that when it is intact it prevents release of fire suppression fluid from the sprinkler device, and when it breaks it causes the fire suppression fluid to be released from the sprinkler device.

The system may comprise a plurality of sprinkler devices, each with an associated sprinkler bulb as recited herein with reference to the first aspect of the invention. The system may be configured to active a plurality of sprinkler bulbs simultaneously. The system may be configured to activate all of the sprinkler bulbs simultaneously.

The sprinkler device may be arranged to wirelessly provide power to the circuit device of the sprinkler bulb. The sprinkler device may be arranged to power the circuit device via the wireless module. The ultraviolet light source may therefore be powered wirelessly by the sprinkler device. The fire suppression system may not comprise tangible, solid wires (e.g. heating wire filaments or electrical connections for power or signals) connected to and/or embedded in the sprinkler bulb.

The system may be configured to activate the sprinkler bulb using less than 1 Watts of power. The system may be configured to use less than 0.9 Watts, 0.8 Watts, 0.7 Watts, 0.6 Watts, 0.5 Watts, 0.4 Watts, 0.3 Watts, 0.2 Watts, or less than 0.1 Watts to activate the sprinkler bulb.

The system may comprise the features as described herein with reference to the first aspect of the invention. Where the system comprises a plurality of sprinkler bulbs, each sprinkler bulb may be as described herein with reference to the first aspect of the invention.

According to a third aspect of the invention there is provide a method of activating a fire suppression system comprising a sprinkler bulb comprising a sealed frangible housing containing a photosensitive fluid, the method comprising: illuminating the photosensitive fluid with ultraviolet light to cause it to undergo a chemical reaction and thereby break the housing.

The method may comprise using less than 1 Watt of power to activate the sprinkler bulb. The method may comprise using less than 0.9 Watts, 0.8 Watts, 0.7 Watts, 0.6 Watts, 0.5 Watts, 0.4 Watts, 0.3 Watts, 0.2 Watts, or less than 0.1 Watts to activate the sprinkler bulb.

The method may comprise activating the sprinkler bulb at a temperature of less than 260 Celsius, less than 240 Celsius, less than 220 Celsius, less than 200 Celsius, less than 180 Celsius, less than 160 Celsius, less than 140 Celsius, less than 120 Celsius, less than 100 Celsius, less than 80 Celsius, less than 60 Celsius, less than 40 Celsius. The method may comprise activating the sprinkler bulb at a temperature of less than 57 Celsius.

The method may comprise using the sprinkler bulb as described herewith with reference to the first aspect of the invention, and/or using a fire suppression system as described herein with reference to the second aspect of the invention.

According to another aspect of the invention there is provided a sprinkler bulb containing a light-activated substance (e.g. a photosensitive fluid), which substance may be configured to undergo a chemical reaction when exposed to ultraviolet light during use to cause the sprinkler bulb to break. According to another aspect of the invention, there is provided a method of breaking a sprinkler bulb containing a light-activated substance (e.g. a photosensitive fluid), comprising illuminating the light-activated substance with ultraviolet light to cause the sprinkler bulb to break.

BRIEF DESCRIPTION OF THE DRAWINGS

Certain embodiments of the invention are described below by way of example only and with reference to the figures in which.

DETAILED DESCRIPTION

Figure 1:
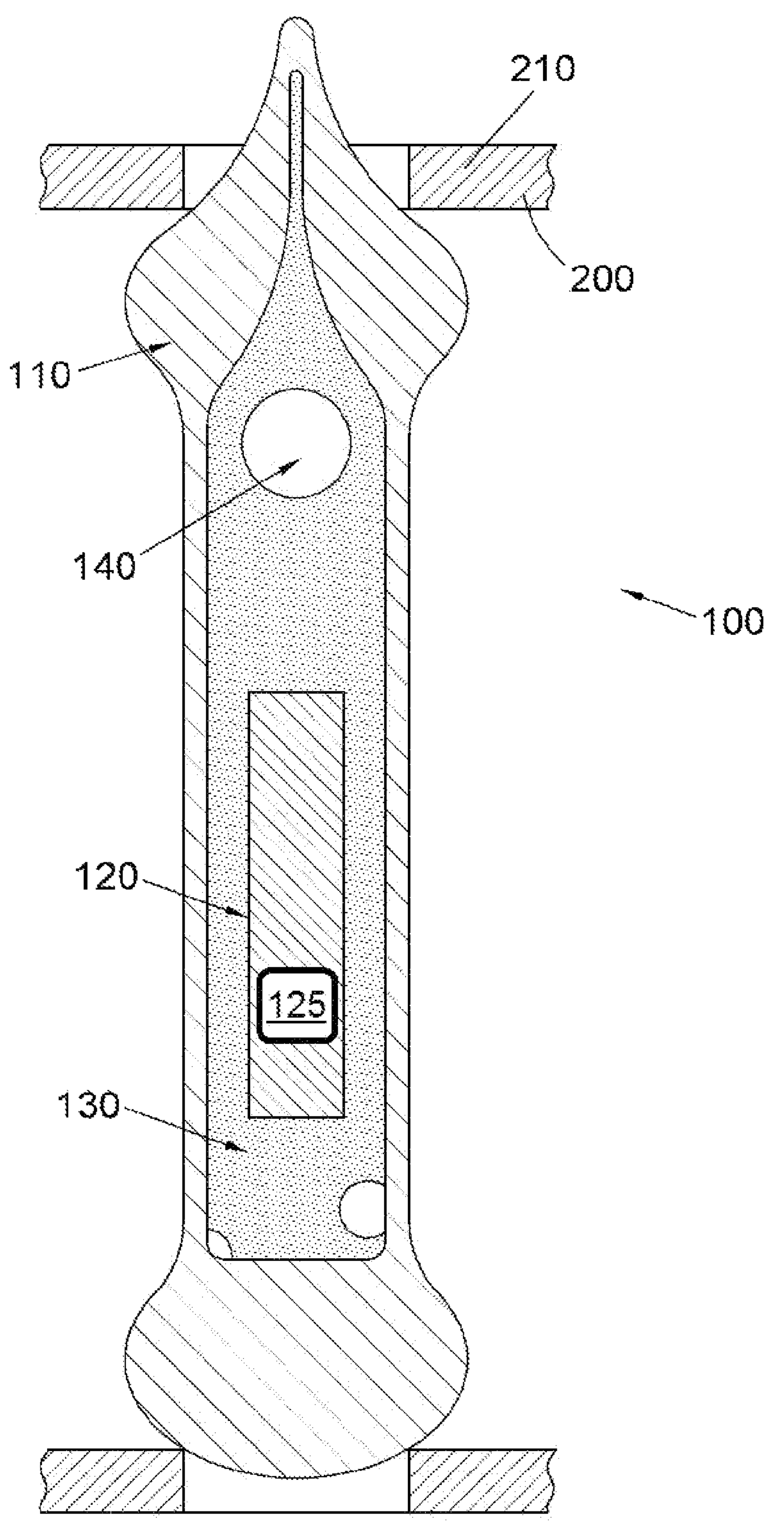
FIG. 1 shows a sprinkler bulb comprising a housing and a circuit device inside the housing, wherein the circuit device comprises an ultraviolet light source.

FIG. 1 shows a sprinkler bulb 100 comprising a sealed frangible housing 110 and a circuit device 120 disposed within the housing 110. The circuit device 120 is therefore sealed inside the housing 110. The housing 110 also contains a photosensitive fluid 130 (in a liquid phase) and a gas bubble 140.

In use, the bulb 100 is located in a sprinkler device 200 (partially shown in FIG. 1) of a fire suppression system (not shown), and is positioned to hold a seal 210, plug or the like in place to prevent fire suppression fluid from leaving the sprinkler device 200. The seal 210 of the sprinkler device 200 is shown in FIG. 1. The sprinkler bulb 100 is arranged so that it prevents deployment of fire suppressant fluid from the sprinkler device 200 unless it breaks. In the event of a fire near the sprinkler device, the liquid 130 in the housing 110 will be heated and therefore pressure within the housing 110 will increase. Once the liquid 130 reaches a predetermined temperature (e.g. indicative of being near a fire), the resulting pressure from the heated liquid 130 will break the frangible housing 110 and the seal 210 of the sprinkler device 200 will no longer be held in place. Fire suppression fluid will then be discharged from the sprinkler device 200. The housing 110, liquid 130, and gas bubble 140 can be configured so that the housing 110 will break under predetermined conditions e.g. when the liquid 130 reaches a predetermined temperature, and hence when the housing 110 is exposed to a predetermined pressure thereby. The housing 110 may be formed of any suitable material such as glass, plastic, crystal, ceramic, quartzoid, or the like. Quartzoid may be preferred for its prevalence in the field.

The circuit device 120 is disposed within the housing 110. It is necessary for proper operation of the sprinkler bulb 100 that the housing 110 is sealed to prevent any and all leaks (e.g. to prevent ingress of any fluid into the housing 110, and/or prevent egress of any fluid out of the housing 110) otherwise the housing 110 may not break in the event of an emergency, as described above. The circuit device 120 is therefore sealed within the housing 110 and cannot simply be provided with external connections e.g. for power and/or communication. The sprinkler bulb 100 does not include any wires or solid electrical connections connected to the circuit device 120. As such, the housing 110 does not have any wires (e.g. a heating filament or an electrical connection) embedded therein.

Figure 2:
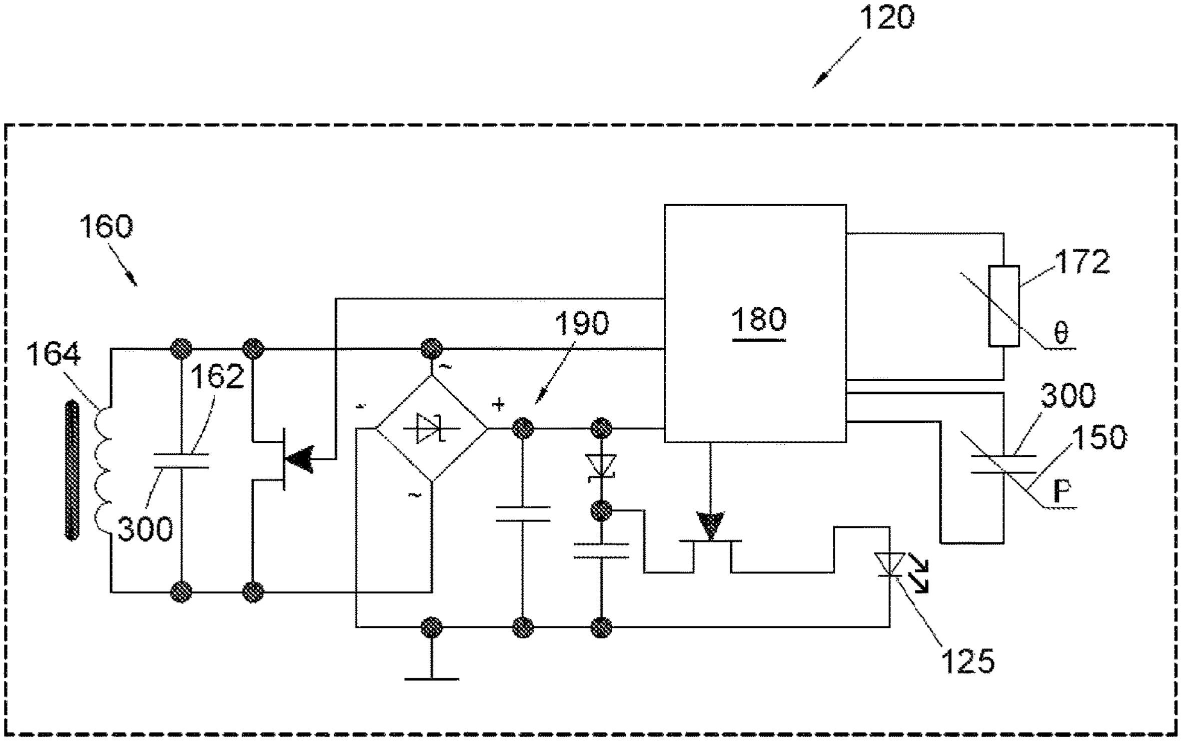
FIG. 2 shows a schematic of the circuit device of FIG. 1.

The circuit device 120 is therefore provided with a wireless unit 160, for example an LC circuit, as shown in FIG. 2. The LC circuit comprises an inductor 164 and a capacitor 162, and is used to generate and/or receive signals at a predetermined frequency (e.g. the resonant frequency of the LC circuit) and/or amplitude. The circuit device 120 may therefore receive signals over a certain bandwidth from outside the housing 110 of the bulb 100. The circuit device 120 also comprises a power storage device 190, so it may receive and store power for its operation via the wireless unit 160 as needed, despite being sealed within the bulb housing 110. The circuit device 120 may also send and receive communication signals via the wireless unit 160, thereby being configured to communicate with other components of the sprinkler device 200 or of a fire suppression system outside the housing 110.

The circuit device 120 comprises a control unit 180 configured to control operation of the circuit device 120 and components thereof. The control unit 180 may control operation of the circuit device 120 autonomously, and/or may control operation of the circuit device 120 under the control of a remote system controller outside the housing 110 arranged to control e.g. a plurality of sprinkler devices and sprinkler bulbs. The control unit 180 may communicate with elements external to the bulb 100 via the wireless unit 160, and/or may be controlled by the remote system controller.

The circuit device 120 comprises a printed circuit board (PCB) and a plurality of electronic components. It comprises capacitors 300, one capacitor 162 forming part of the wireless unit 160, and one configured as a pressure sensor 150. The circuit device also comprises a temperature sensor 172 for sensing the temperature of the fluid 130 in the housing 110.

The circuit device 120 also comprises an ultraviolet (UV) light source 125, such as a UV bulb, a UV LED or the like. The UV light source 125 may be activated to emit UV radiation. Since the circuit device 120 is in, and surrounded by and exposed to, the photosensitive fluid 130, the fluid 130 will be exposed to UV radiation from the UV light source 125 when it is activated. The UV light source 125 is therefore arranged to illuminate the photosensitive fluid 130 when activated.

The photosensitive fluid 130 has a chemical structure that makes it sensitive to ultraviolet radiation. In use, ultraviolet radiation from the UV light source 125 causes the fluid 130 to undergo a chemical reaction, which subsequently causes pressure in the housing 110 to increase. The fluid 130 and the housing 110 may be selected and configured so that the pressure in the housing 110 will exceed a predetermined threshold needed to cause the housing 110 to break when the UV light source 125 is activated. The sprinkler bulb 100 may therefore be activated (i.e. the housing 110 broken for release of fire suppression fluid by the sprinkler device 200) by activating the UV light source 125. Thus, the sprinkler device 200 may be activated and fire suppression fluid may be dispensed.

Although any suitable light-activated substance may be used, the photosensitive fluid 130 is preferably 3M™

Novec™ 1230 Fire Protection Fluid, which is 1,1,1,2,2,4,5,5,5-nonafluoro-4-(trifluoromethyl)-3-pentanone. That is, the photosensitive fluid is CF3CF2C(═O)CF(CF3)2, or C2F5C(O)CF(CF3)2. The fluid 130 undergoes photolysis and substantial decay when exposed to UV radiation. It has a suitable UV cross-section with a maximum wavelength of absorbance at 306 nanometres (nm), and shows significant absorbance at wavelengths above 300 nm. The UV light source 125 is therefore configured to emit UV radiation above 300 nm, and is configured to emit radiation in the range of 300 nm to 320 nm, or 300 nm to 310 nm.

The photosensitive fluid 130 is also itself a fire suppression fluid, as well as being electrically non-conductive and safe for immersion of electronics (sometimes called 'dry water'). The circuit device 120 can therefore be immersed in the fluid 130 without affecting its operability.

In use, the sprinkler bulb 100 may be commanded (e.g. by a remote system controller of a fire suppression system) to activate. The wireless unit 160 may receive an activation signal and the control unit 180 may activate the ultraviolet light source 125 in response to the activation signal. The ultraviolet light source 125 may then illuminate the photosensitive fluid 130 and cause it to undergo the chemical reaction, thereby increasing pressure within the housing 110 until the housing 110 breaks. Fire suppression fluid may be released from the sprinkler device 200 as a consequence of the housing 110 breaking. The fire suppression system may simultaneously command a plurality of sprinkler bulbs 100 to activate. The sprinkler bulbs 100 may be activated at temperatures lower than those required to activate them by heating.

What is claimed is:

1. A sprinkler bulb for a fire suppression system, comprising:

a sealed frangible housing (110);

a circuit device (120) within the housing (110), wherein the circuit device (120) comprises an ultraviolet light source (125); and a photosensitive fluid (130) within the housing that in use undergoes a chemical reaction when exposed to ultraviolet light from the light source (125).

2. A sprinkler bulb as claimed in claim 1, wherein the circuit device (120) comprises a wireless module (160) for receiving power.

3. A sprinkler bulb as claimed in claim 1, wherein the circuit device (120) comprises a heating element operable to heat the photosensitive fluid (130).

4. A sprinkler bulb as claimed in claim 1, wherein the photosensitive fluid (130) is 1,1,1,2,2,4,5,5,5-nonafluoro-4-(trifluoromethyl)-3-pentanone.

5. A sprinkler bulb as claimed in claim 1, wherein the housing (110) is opaque to ultraviolet radiation.

6. A sprinkler bulb as claimed in claim 1, wherein the sprinkler bulb is arranged to break by using less than 1 Watts of power.

7. A sprinkler bulb as claimed in claim 1, wherein the sprinkler bulb is operable to break at a temperature of less than 57 Celsius.

8. A sprinkler bulb as claimed in claim 1, wherein the sealed frangible housing (110), the ultraviolet light source (125), and/or the photosensitive fluid (130) are configured such that the housing (110) will break when pressure within the housing (110) reaches a predetermined threshold.

9. A fire suppression system comprising a sprinkler device (200) and a sprinkler bulb (100) as claimed in claim 1.

10. A fire suppression system as claimed in claim 9, wherein the sprinkler device (200) is arranged to wirelessly provide power to the circuit device (120).

11. A method of activating a fire suppression system comprising a sprinkler bulb as claimed in claim 1, the method comprising:

illuminating the photosensitive fluid (130) with ultraviolet light to cause it to undergo a chemical reaction and thereby break the housing (110).

12. A method as claimed in claim 11, comprising using less than 1 Watt of power to activate the sprinkler bulb (100).

13. A method as claimed in claim 11, comprising activating the sprinkler bulb (100) at a temperature of less than 57 Celsius.

* * * * *